(No Model.)
G. W. BAIRD.
Steam Steering Apparatus.
No. 238,269. Patented March 1, 1881.
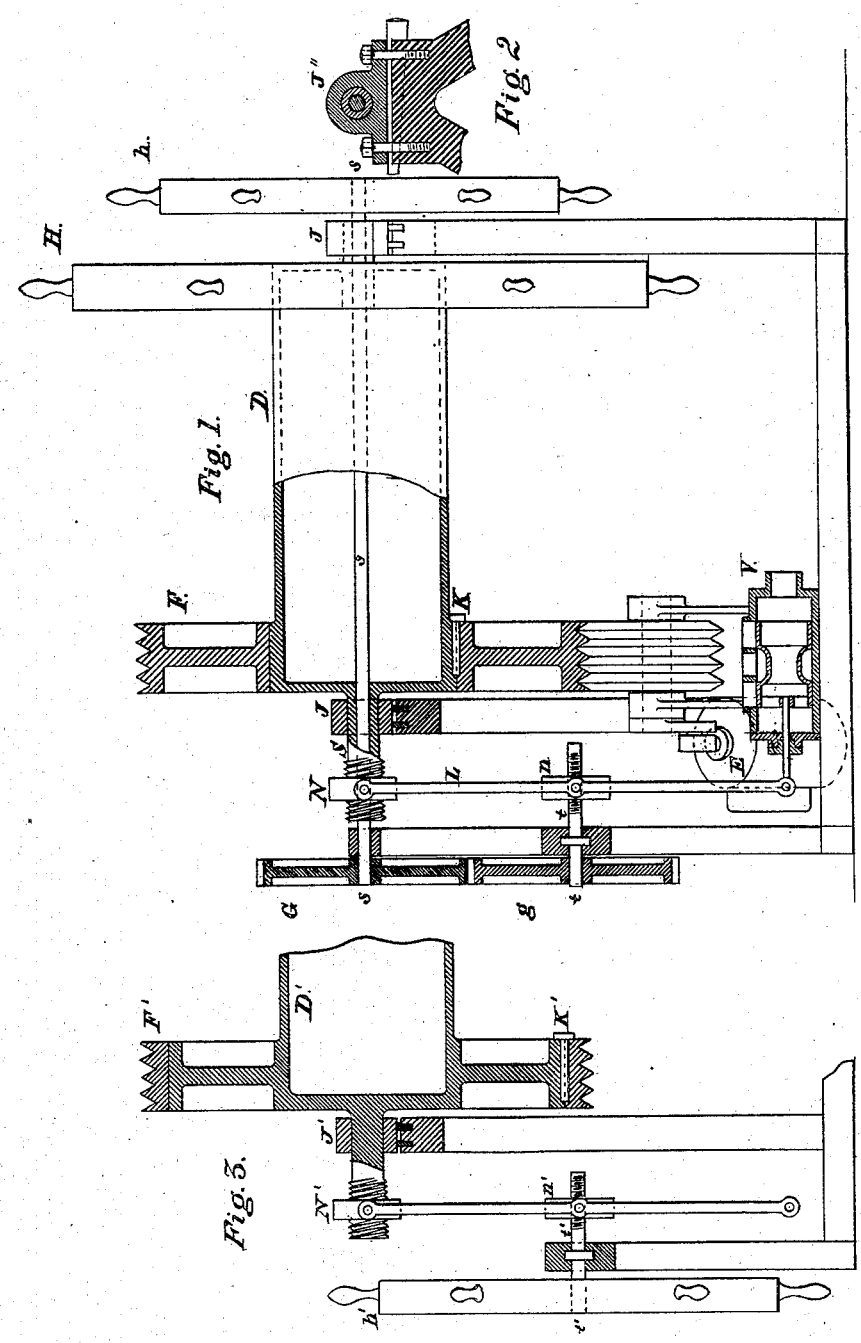
WITNESSES
Andw J Smith
W. C. Chaffee
INVENTOR
G. W. Baird.

UNITED STATES PATENT OFFICE.

GEORGE W. BAIRD, OF THE ENGINEER CORPS, UNITED STATES NAVY.

STEAM STEERING APPARATUS.

SPECIFICATION forming part of Letters Patent No. 238,269, dated March 1, 1881.

Application filed December 2, 1880. (No model.)

*To all whom it may concern:*

Be it known that I, G. W. BAIRD, an officer in the Engineer Corps of the Navy, residing at Washington, District of Columbia, have invented certain new and useful Improvements in Steam-Steering Apparatus for Ships; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to improve the pneumatic machine for which Joseph C. Lewis and myself received Letters Patent dated November 9, 1875, which bear number 169,612.

My improvement consists in the construction and arrangement of the valve-gear, drum, and friction-gear, so that the whole device may be easily used as a steam or hand steering device.

Figure 1 is a vertical longitudinal view, the right-hand or forward end showing an elevation of the hand steering-wheel H and the steam steering-wheel $h$, and the left-hand or after end showing a section of the friction-wheel and the automatic motion. Fig. 2 is a vertical transverse section through the journal J of Fig. 1, and Fig. 3 is a modification of the corresponding part of Fig. 1.

In place of permanently securing the friction-wheel F in Fig. 1 to the drum D, I now make it freely movable upon that drum, and secure it, when necessary, by the key K, or it may be part of the drum with its rim freely movable, as in Fig. 3, and held by the key K.

The axis of the drum D is prolonged, and has upon it a thread, upon whch the nut N, Fig. 1, works. Through the axis of the drum I pass a small shaft, $s$, having upon one end the steam steering-wheel $h$, and upon the other the toothed gear-wheel G. Now, G gears into another gear-wheel, $g$, and any motion of the wheel $h$ will cause motion to the screw $t$, which is screwed to the wheel $g$, and the nut $n$ upon the screw $t$ is thus moved along the line of its axis. The lever L is connected to the nuts N and $n$, and to the valve V, and if it receives motion at $n$, its fulcrum being at N, the result is that the valve V is moved. Now, motion to the valve V gives steam to the steam-engine E and causes it to rotate, and to move, through the friction-gear, the drum D, which moves the rudder; but the prolonged axis of D, having upon it the screw described, will move the nut N, which carries that end of the lever L, and as the fulcrum is now at $n$ the valve V is pushed in the opposite direction and is closed, which stops the engine; and by regulating these motions by the proper ratio of pitch of thread and of gearing, the angular motion of the drum D can be made to respond to an equal angular motion of the hand-wheel $h$, and D can be made automatically to stop when it has accomplished that amount of motion.

The valve V reverses the engine by changing the ports. A link may be used instead. This is not new.

Instead of mounting $h$ on the front, as in Fig. 1, it can be placed on the screw $t$, as in Fig. 3, which is a simple arrangement.

The friction-gearing may be tightened up or slacked off by lowering or raising the axis of the drum by means of the keys shown in Fig. 2.

In place of the toothed gearing, as shown in Fig. 1, ordinary pulleys and belts may be used, or a chain belt and pulleys.

Having described the parts, I will now describe its operation.

In order to steer by steam (or compressed air) the hand-wheel $h$, Fig. 1, is moved upon its axis. This motion is imparted to the reversing valve (of the engine) V through the shaft $s$, gears G $g$, bolt $t$, nut $n$, and floating lever L. Steam being now upon the pistons the engine turns the drum through the friction-gears, the motion of the drum D imparts motion to the nut N, which moves the lever back and closes the valve V, and thus stops the engine.

In order to steer by hand the key K, Figs. 1 and 3, is removed, which permits the drum D to revolve freely inside the friction-wheel, and the latter can stand still while the drum D is revolved by the hand-wheel H, and steering is thus performed by hand.

I am aware that a valve-lever having alternate fulcrums on a couple of screws is old; also, that a steering apparatus in which the steam-power is disconnected from the rudder-post by the removal of a number of keys is old; but necessarily a number of keys have to be used, as the gearing is rigid and does not allow any of the parts to slip when the rudder is struck by a sea. In my device, where I use the friction-gear I use but one key, which is easily drawn or replaced for connecting or disconnecting the steam-power to or from the drum, and which is not liable to be cut in two by the sea striking the rudder, as the gears will slip upon one another when the rudder is struck by a sea, thereby relieving any sudden strain upon the key.

I claim—

1. In a steering apparatus, a friction-wheel arranged upon the barrel, (or drum,) in combination with the movable key, substantially as specified.

2. In a steam steering apparatus, the drum having the screw-thread on its prolonged axis, in combination with the valve-lever, hand operating-screw, and friction-gear, all substantially as shown and described.

3. In a steam steering apparatus, the drum D, having the screw-thread on the prolonged axis, in combination with the adjustable journal-boxes, the friction-gear, lever L, screw t, gears g G, shaft S, hand-wheel h, all substantially as shown and described.

In testimony whereof I affix my signature in presence of two witnesses.

GEORGE W. BAIRD.

Witnesses:
GEO. M. LOCKWOOD,
ANDW. V. SMITH.